US010481665B2

(12) United States Patent
Overcash

(10) Patent No.: US 10,481,665 B2
(45) Date of Patent: Nov. 19, 2019

(54) CONFIGURATION OF ENERGY SAVINGS

(71) Applicant: Cisco Technology, Inc., San Jose, CA (US)

(72) Inventor: Michael Overcash, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/925,454

(22) Filed: Mar. 19, 2018

(65) Prior Publication Data

US 2018/0239411 A1 Aug. 23, 2018

Related U.S. Application Data

(62) Division of application No. 14/012,590, filed on Aug. 28, 2013, now Pat. No. 9,958,924.

(51) Int. Cl.
| | |
|---|---|
| H04L 29/06 | (2006.01) |
| G06F 1/32 | (2019.01) |
| G06F 1/3209 | (2019.01) |
| G06F 1/3234 | (2019.01) |

(52) U.S. Cl.
CPC ............ *G06F 1/32* (2013.01); *G06F 1/3209* (2013.01); *G06F 1/3278* (2013.01); *H04L 63/0263* (2013.01); *H04L 63/101* (2013.01); *Y02D 10/157* (2018.01); *Y02D 50/20* (2018.01)

(58) Field of Classification Search
CPC ... H04L 63/02; H04L 63/0263; H04L 63/101; H04L 63/0227; G06F 1/32; G06F 1/3209; G06F 1/3278; Y02D 50/20; Y02D 10/17; Y02D 10/171

USPC .................................................... 726/11–14
See application file for complete search history.

(56) References Cited

U.S. PATENT DOCUMENTS

| | | | |
|---|---|---|---|
| 4,785,927 | A | 11/1988 | Dobbins |
| 5,523,781 | A | 6/1996 | Brusaw |
| 5,802,305 | A | 9/1998 | McKaughan et al. |
| 5,883,901 | A | 3/1999 | Chiu et al. |
| 5,969,748 | A | 10/1999 | Casement et al. |
| 6,233,235 | B1 | 5/2001 | Burke et al. |
| 6,269,343 | B1 | 7/2001 | Pallakoff |
| 6,415,270 | B1 | 7/2002 | Rackson et al. |
| 6,522,265 | B1 | 2/2003 | Hillman et al. |
| 6,618,709 | B1 | 9/2003 | Sneeringer |

(Continued)

OTHER PUBLICATIONS

"Cisco Energywise"; Cisco Systems; Feb. 1, 2009; archived from http://www.archive.org; pp. 1-6.

(Continued)

*Primary Examiner* — Hosuk Song
(74) *Attorney, Agent, or Firm* — Merchant & Gould P.C.

(57) ABSTRACT

According to one example embodiment, a modem or other network device include an energy module configured to enter a low-power, low-bandwidth state when not in active use by a user. The low-power state may be maintained under certain conditions where network activity is not present, and or when only non-bandwidth-critical traffic is present. The network device may include a user interface for configuring firewall rules, and the user may be able to concurrently designate particular types of traffic as important or unimportant. The energy module may also be integrated with a firewall, and power saving rules may be inferred from firewall rules.

20 Claims, 9 Drawing Sheets

(56) References Cited

U.S. PATENT DOCUMENTS

| | | | |
|---|---|---|---|
| 6,681,156 B1 | 1/2004 | Weiss | |
| 6,686,709 B2 | 2/2004 | Lee et al. | |
| 6,765,925 B1 | 7/2004 | Sawyer et al. | |
| 6,785,564 B1 | 8/2004 | Quigley et al. | |
| 6,785,592 B1 | 8/2004 | Smith et al. | |
| 6,930,947 B2 | 8/2005 | Chen | |
| 6,980,526 B2 | 12/2005 | Jang | |
| 7,055,173 B1 * | 5/2006 | Chaganty | H04L 41/0654 726/11 |
| 7,058,524 B2 * | 6/2006 | Hayes | G01D 4/004 340/870.01 |
| 7,084,752 B2 | 8/2006 | Parello et al. | |
| 7,133,374 B2 | 11/2006 | Lo et al. | |
| 7,177,728 B2 | 2/2007 | Gardner | |
| 7,188,260 B1 | 3/2007 | Shaffer et al. | |
| 7,203,849 B2 | 4/2007 | Dove | |
| 7,233,620 B2 | 6/2007 | Brommer | |
| 7,263,450 B2 | 8/2007 | Hunter | |
| 7,324,518 B2 | 1/2008 | Dai et al. | |
| 7,337,336 B2 | 2/2008 | Ferentz et al. | |
| 7,352,769 B2 | 4/2008 | Hooper et al. | |
| 7,366,933 B1 | 4/2008 | Aharonian et al. | |
| 7,392,407 B2 | 6/2008 | Jonnala et al. | |
| 7,587,746 B1 | 9/2009 | Schwartzman et al. | |
| 7,698,580 B2 | 4/2010 | Schindler et al. | |
| 7,734,572 B2 | 6/2010 | Weimeyer et al. | |
| 7,904,642 B1 | 3/2011 | Gupta et al. | |
| 7,908,201 B2 | 3/2011 | Kim et al. | |
| 7,921,306 B2 | 4/2011 | Dove | |
| 7,941,677 B2 | 5/2011 | Penning | |
| 7,948,963 B2 | 5/2011 | Rioux et al. | |
| 7,957,332 B1 | 6/2011 | Chow et al. | |
| 7,966,502 B2 | 6/2011 | Diab et al. | |
| 7,970,000 B2 | 6/2011 | Roeck | |
| 7,974,298 B2 | 7/2011 | Baird et al. | |
| 8,010,469 B2 * | 8/2011 | Kapoor | G06F 9/505 706/20 |
| 8,073,329 B2 | 12/2011 | Gao et al. | |
| 8,160,753 B2 | 4/2012 | Ferentz et al. | |
| 8,225,124 B2 | 7/2012 | Geiger et al. | |
| 8,250,381 B2 | 8/2012 | Hansalia et al. | |
| 8,261,104 B2 | 9/2012 | Landry et al. | |
| 8,301,918 B2 | 10/2012 | Diab et al. | |
| 8,352,391 B1 | 1/2013 | Kapadia | |
| 8,352,754 B2 | 1/2013 | Chin | |
| 8,407,332 B1 | 3/2013 | Kraipak et al. | |
| 8,443,069 B2 * | 5/2013 | Bagepalli | H04L 63/166 709/203 |
| 8,588,120 B2 | 11/2013 | Lee et al. | |
| 8,732,501 B1 | 5/2014 | Ghose et al. | |
| 8,745,429 B2 | 6/2014 | Ghose et al. | |
| 8,793,767 B2 * | 7/2014 | Schweitzer, III | G06F 21/606 726/3 |
| 8,799,633 B2 | 8/2014 | Suganami | |
| 8,849,743 B2 | 9/2014 | Claise et al. | |
| 9,141,169 B2 | 9/2015 | Overcash et al. | |
| 9,282,001 B2 * | 3/2016 | Bell | H04L 12/4625 |
| 2002/0016639 A1 | 2/2002 | Smith et al. | |
| 2002/0040475 A1 | 4/2002 | Yap et al. | |
| 2002/0157030 A1 | 10/2002 | Barker et al. | |
| 2003/0037160 A1 | 2/2003 | Wall et al. | |
| 2003/0120959 A1 | 6/2003 | Bohrer et al. | |
| 2004/0010601 A1 | 1/2004 | Afergan et al. | |
| 2004/0148388 A1 | 7/2004 | Chung et al. | |
| 2005/0055589 A1 | 3/2005 | Kojo | |
| 2005/0123109 A1 | 6/2005 | Yamagishi et al. | |
| 2005/0220126 A1 | 10/2005 | Gervais et al. | |
| 2005/0243861 A1 | 11/2005 | Elkayam et al. | |
| 2006/0053324 A1 | 3/2006 | Giat et al. | |
| 2006/0056397 A1 | 3/2006 | Aizu et al. | |
| 2006/0064484 A1 | 3/2006 | Fawcus | |
| 2006/0072531 A1 | 4/2006 | Ewing et al. | |
| 2006/0160561 A1 | 7/2006 | Uno et al. | |
| 2007/0014268 A1 | 1/2007 | Kim et al. | |
| 2007/0024239 A1 | 2/2007 | Park | |
| 2007/0043477 A1 | 2/2007 | Ehlers et al. | |
| 2007/0050818 A1 | 3/2007 | Berger et al. | |
| 2007/0067445 A1 | 3/2007 | Vugenfirer et al. | |
| 2007/0135086 A1 | 6/2007 | Stanford | |
| 2007/0143637 A1 | 6/2007 | Tsai | |
| 2007/0189257 A1 | 8/2007 | Suzuki et al. | |
| 2007/0214473 A1 | 9/2007 | Barton et al. | |
| 2007/0276547 A1 | 11/2007 | Miller | |
| 2008/0001584 A1 | 1/2008 | Chen | |
| 2008/0037999 A1 | 2/2008 | Masuda et al. | |
| 2008/0052546 A1 | 2/2008 | Schindler et al. | |
| 2008/0063381 A1 | 3/2008 | Conroy et al. | |
| 2008/0104393 A1 | 5/2008 | Glasser et al. | |
| 2008/0168283 A1 | 7/2008 | Penning | |
| 2008/0178232 A1 | 7/2008 | Velusamy | |
| 2008/0215899 A1 | 9/2008 | Jonnala et al. | |
| 2008/0215902 A1 | 9/2008 | Jonnala et al. | |
| 2008/0225841 A1 | 9/2008 | Conway et al. | |
| 2008/0244282 A1 | 10/2008 | Hansalia et al. | |
| 2008/0256371 A1 | 10/2008 | Diab et al. | |
| 2008/0272741 A1 | 11/2008 | Kanamori | |
| 2008/0301322 A1 | 12/2008 | Horibe | |
| 2008/0303486 A1 | 12/2008 | Kao et al. | |
| 2009/0049315 A1 | 2/2009 | Diab et al. | |
| 2009/0070603 A1 | 3/2009 | Diab et al. | |
| 2009/0077347 A1 | 3/2009 | Edwards et al. | |
| 2009/0083167 A1 | 3/2009 | Subbloie | |
| 2009/0132839 A1 | 5/2009 | Rothman et al. | |
| 2009/0182834 A1 | 7/2009 | Zettler et al. | |
| 2009/0195349 A1 | 8/2009 | Frader-Thompson et al. | |
| 2009/0196281 A1 | 8/2009 | Kouchri | |
| 2009/0217063 A1 | 8/2009 | Tomita | |
| 2009/0217188 A1 | 8/2009 | Alexander et al. | |
| 2009/0228723 A1 | 9/2009 | Yoshizaki | |
| 2009/0232039 A1 | 9/2009 | Jung | |
| 2009/0249091 A1 | 10/2009 | Goodnow et al. | |
| 2009/0263127 A1 | 10/2009 | Haran et al. | |
| 2009/0282277 A1 | 11/2009 | Sedarat et al. | |
| 2009/0310607 A1 | 12/2009 | Evans | |
| 2009/0327479 A1 | 12/2009 | Zavalkovsky et al. | |
| 2010/0052421 A1 | 3/2010 | Schindler et al. | |
| 2010/0070217 A1 | 3/2010 | Shimada et al. | |
| 2010/0080111 A1 | 4/2010 | Diab et al. | |
| 2010/0111523 A1 | 5/2010 | Hirth et al. | |
| 2010/0145542 A1 | 6/2010 | Chapel et al. | |
| 2010/0162294 A1 | 6/2010 | Yin et al. | |
| 2010/0162305 A1 | 6/2010 | Downey et al. | |
| 2010/0172628 A1 | 7/2010 | Berger et al. | |
| 2010/0175124 A1 | 7/2010 | Miranda | |
| 2010/0205466 A1 | 8/2010 | Diab et al. | |
| 2010/0235868 A1 | 9/2010 | Howarter et al. | |
| 2010/0241880 A1 | 9/2010 | Wertheimer et al. | |
| 2010/0247068 A1 | 9/2010 | Howarter et al. | |
| 2010/0299173 A1 | 11/2010 | Zampiello et al. | |
| 2010/0309904 A1 | 12/2010 | Couse | |
| 2010/0322078 A1 | 12/2010 | Wang et al. | |
| 2010/0325686 A1 | 12/2010 | Davis et al. | |
| 2010/0329108 A1 | 12/2010 | Diab et al. | |
| 2011/0022699 A1 | 1/2011 | Powell et al. | |
| 2011/0029796 A1 | 2/2011 | Matthews et al. | |
| 2011/0067048 A1 | 3/2011 | Barton et al. | |
| 2011/0072286 A1 | 3/2011 | Graham | |
| 2011/0125337 A1 | 5/2011 | Zavadsky et al. | |
| 2011/0131428 A1 | 6/2011 | Diab et al. | |
| 2011/0131438 A1 | 6/2011 | Levitan | |
| 2011/0157939 A1 | 6/2011 | Wang et al. | |
| 2011/0191608 A1 | 8/2011 | Vetteth | |
| 2011/0194474 A1 | 8/2011 | Kim et al. | |
| 2011/0199046 A1 | 8/2011 | Tsai et al. | |
| 2011/0239019 A1 | 9/2011 | Johnston | |
| 2011/0246797 A1 | 10/2011 | Diab et al. | |
| 2011/0287793 A1 | 11/2011 | Tenny et al. | |
| 2011/0320833 A1 | 12/2011 | R. et al. | |
| 2012/0045210 A1 | 2/2012 | Kim et al. | |
| 2012/0095610 A1 | 4/2012 | Chapel et al. | |
| 2012/0120958 A1 | 5/2012 | Mahadevan et al. | |
| 2012/0226918 A1 | 9/2012 | Rallo | |
| 2012/0259474 A1 | 10/2012 | Razum et al. | |

(56) References Cited

U.S. PATENT DOCUMENTS

| | | |
|---|---|---|
| 2012/0284537 A1 | 11/2012 | Kruglick |
| 2013/0024706 A1 | 1/2013 | Katar et al. |
| 2013/0061076 A1 | 3/2013 | VerSteeg |
| 2013/0121172 A1 | 5/2013 | Cheng et al. |
| 2013/0132745 A1 | 5/2013 | Schoening et al. |
| 2013/0191663 A1 | 7/2013 | Overcash et al. |
| 2013/0201079 A1 | 8/2013 | Chao et al. |
| 2013/0303202 A1 | 11/2013 | Jafarian et al. |
| 2013/0332001 A1 | 12/2013 | Parello et al. |
| 2015/0237658 A1 | 8/2015 | Fontaine et al. |
| 2015/0372977 A1 | 12/2015 | Yin |

OTHER PUBLICATIONS

"IEEE Standard for Information Technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Data Terminal Equipment (DTE) Power via Media Department Interface (MDI)," © 2003 IEE, Jun. 18, 2003, 121 pages.

Bennett, Mike, "IEEE 802.3az Energy Efficient Ethernet," Task Force Update, Presented to the P802.3ba Task Force, Denver, CO; Jul. 16, 2008; 17 pages; http://www.ieee802.org/3/az/public/jul08/bennett_03_0708.pdf.

"Data Link Layer," Wikipedia , Jun. 28, 2014, 7 pages, http://en.wikipedia.org/wiki/Data_link_layer.

"Link Layer Discovery Protocol," Wikipedia, Mar. 28, 2014, 4 pages; http://en.wikipedia.org/wiki/Link_Layer_iscovery_Protocol.

Haran, Onn, "Applicability of EEE to Fiber PHYs," IEEE 8.02.3 EEE Meeting; Sep. 2007, Seoul, Korea; http://www.ieee802.org/3/eee_study/public/sep07/haran_1_0907.pdf; 12 pages.

Nordman, Bruce, "Energy Efficient Ethernet: Outstanding Questions," Mar. 12, 2007; 3 pages; http://grouper.ieee.org/groups/802/3/eee_study/public/mar07/nordman2_01_0307.pdf.

Nordman, Bruce, et al., "Energy Efficiency and Regulation," IEEE 802 Tutorial; Jul. 13, 2009; 58 pages.

SMART Board™, "Interactive Whiteboard," Sep. 2005; © 2005 SMART Technologies, Inc.: 2 pages.

"Wake on Local Area Network (LAN)," EnergyStar Products, Energy Star; [printed on Nov. 16, 2011]; 4 pages; http://www.energystar.gov/index.cfm?c=power_mgt.pr_power-mgt-wol.

Wertheimer, Aviad and Eric Mann, "Active/Idle Toggling with Low-Power Idle," IEEE 802.3az Jan. 2008 Interim Meeting; 15 pages.

Jetzt, et al, LLDP/LLDP-MED Proposal for PoE Plus,; PoE Plus Task Force, Sep. 15, 2006, Knoxville, TN; 15 pages.

Wertheimer, et al., "Capabilities Negotiation Proposal for Energy-Efficient Ethernet," IEEE 802.3az, May 2008, pp. 1-18.

"MAC Address Definition," The Linux Information Proposal for Energy-Efficient Ethernet, IEEE 802.3az, May 2008, pp. 1-18.

* cited by examiner

CONFIGURATION OF ENERGY SAVINGS

CROSS-REFERENCE TO RELATED APPLICATIONS

This application is a divisional of and claims priority to U.S. patent application Ser. No. 14/012,590, filed Aug. 28, 2013, now U.S. Pat. No. 9,958,924, issued on May 1, 2018, the disclosure of which is hereby incorporated herein by reference in its entirety.

TECHNICAL FIELD

This disclosure relates in general to the field of energy and, more particularly, to a system and a method for conserving power in an access network without loss of service quality.

BACKGROUND

Modern hardware can generally be placed into various low-power states, where various components may be throttled down or disabled altogether. Certain low-power states cause a total loss of network connectivity for some period of time. This makes low-power features difficult (almost impossible) to use for some devices (e.g., set-top boxes and embedded multimedia terminal adapters (eMTAs) that need continuous uninterrupted access to upstream and/or downstream data). Power savings strategies should be employed as frequently as possible without interrupting important data flows.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

In one aspect there is disclosed a firewall comprising logic for providing firewall rules; a user interface for configuring the firewall rules, the interface configured to permit a user to designate a first species of traffic as blocked, a second species of traffic as allowed, and for allowed traffic, to designate a first subspecies as important and a second subspecies as unimportant. In another aspect there is disclosed a method comprising classifying network traffic into a first species and second species according to firewall rules; and inferring an access control list (ACL) for a network device energy module based on the classification.

In yet another aspect there is disclosed a modem energy module comprising a communication interface configured to receive firewall rules from a firewall; and logic for inferring an access control list (ACL) from the firewall rules, wherein the ACL designates a first class of traffic as important and a second class of traffic as unimportant.

Detailed Description of Example Embodiments

A method is provided in one example embodiment and includes receiving a first data at a first network element; determining that the first data does not match an entry in an access control list identifying important or bandwidth-critical data; and sending a first message to a second network element that causes the second network element to enter into a low-power state. In yet another example embodiment, the method can include receiving a second data; determining that the second data matches an entry in the access control list identifying important or bandwidth-critical data; buffering the second data; sending a second message to the second network element, where the second message causes the second network element to exit the low-power state; and sending the buffered second data to the second network element.

More specific implementations may include receiving a second data at the first network element, where the second data matches an entry in the access control list; buffering the second data; increasing a number of channels allocated to the second network element; and sending the buffered second data to the second network element. The first network element can be a cable modem termination system (CMTS), and the second network element can be a cable modem (CM). Copies of the access control list are provided in the CMTS and the CM. According to one example embodiment of the present disclosure, ACLs may be integrated with or inferred from explicit firewall rules to better match an end-user's subjective expectations for network access.

Figure 1:
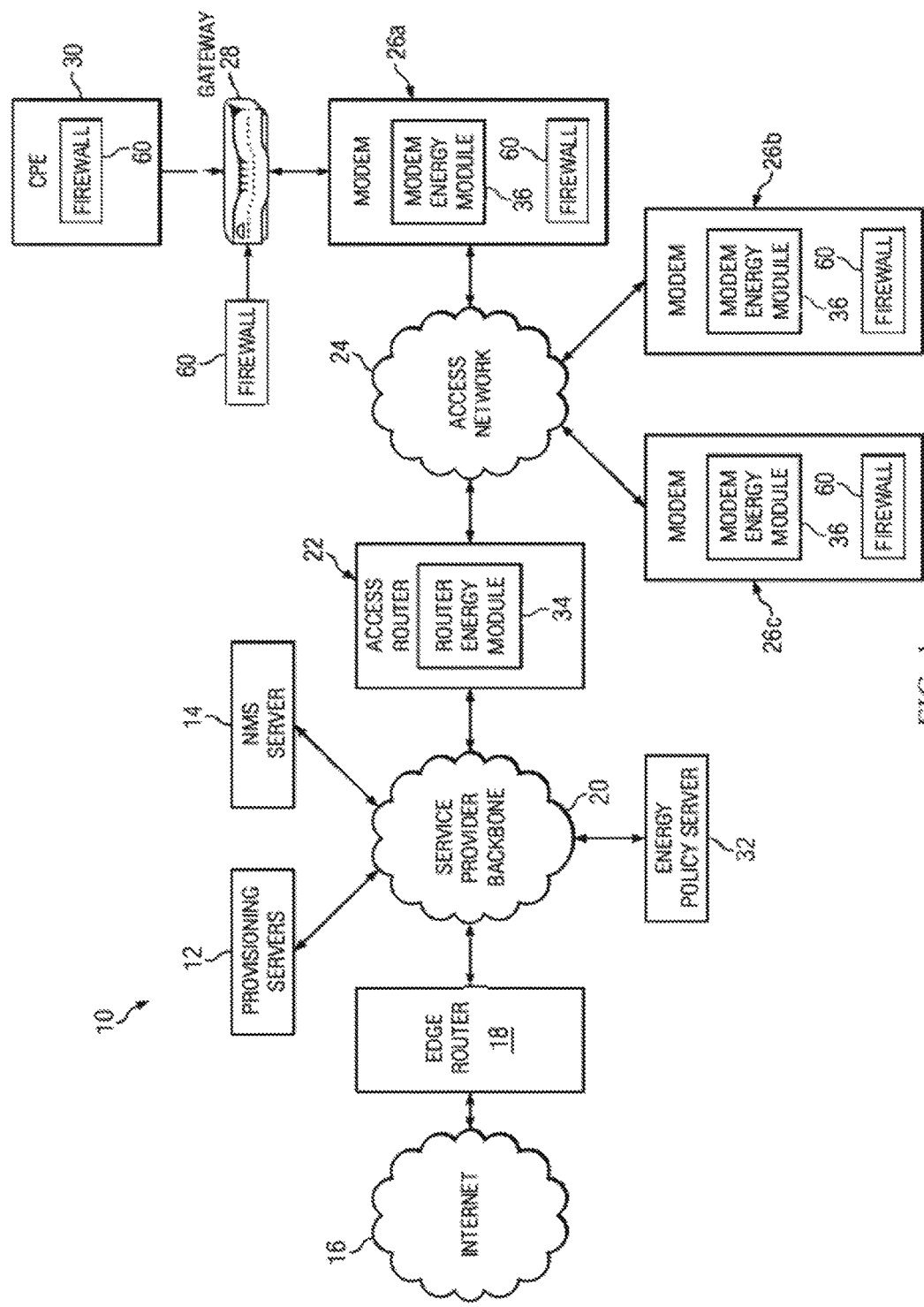
FIG. 1 is a block diagram of an energy management system in accordance with one embodiment of the present disclosure.

FIG. 1 is a simplified block diagram of an energy management system 10 in accordance with one example implementation of the present disclosure. FIG. 1 includes provisioning servers 12, a network management system (NMS) server 14, an Internet 16, an edge router 18, a service provider backbone 20, an access router 22, an access network 24, a plurality of modems 26a-c, a gateway 28, a customer premise equipment (CPE) 30, and an energy policy server 32. Access router 22 can include a router energy module 34, and each of the plurality of modems 26a-c can include a modem energy module 36. In some embodiments, a firewall 60 may be provided in one or more of gateway 28, CPE 30, and modems 26, by way of non-limiting example.

Those with skill in the art will recognize that although firewalls 60 are shown in each of the foregoing, a firewall need not be included for the devices to function. Firewall 60 may also be, in some embodiments, a separate network device. The function of firewall 60 is described in more detail in connection with FIG. 8.

In general terms, energy management system 10 can be configured to communicate with modems 26a-c to shift from one power state to a different power state. More specifically, access router 22 and modems 26a-c can use access control lists (ACLs) to identify important data when making decisions about the desired power saving state of modems 26a-c. Note that while in the examples discussed herein, an ACL is used as a way to sort or to classify traffic, other methods may equally be used, such as a data over cable service interfaces specification (DOCSIS) classifier, a telecommunications access method (TCAM), etc. If a specific modem (e.g., modem 26a) is in a reduced power state, access router 22 and the modem can buffer important data to minimize data loss. Any unimportant data may be ignored or deliberately lost, thereby allowing the modem to remain in a deeper power savings state. In an embodiment, all (or a portion) of the unimportant data can also be buffered. In yet another embodiment, unimportant data can be received, but uses less than the full capability of modem 26.

When the modem exits the power saving state and enters a state that would allow the modem to receive the data, access router 22 can send the buffered data to the modem. Further, when the modem exits the power saving state, the modem can send any buffered data from the modem to the access router. From a business perspective, the smart loading capabilities of the architecture allow for realizable cost savings. Furthermore, energy management system 10 may provide a mechanism that can identify important data and wake modem 26 to receive the important data or to send the important data.

In one example implementation, the modem may use a combination of power savings strategies. For example, the modem may utilize duty-cycle based power savings, where the modem moves into a low-power standby state and periodically wakes up to look for a wake-up signal from access router 22. In another example, the modem may decrease the number of utilized channels and/or transmitters. Further, the modem may enter into a "light sleep" mode, where a single downstream channel remains active and all the other downstream channels and all upstream transmitters are in a standby mode. The single downstream channel can watch for wake-up signals. In addition, the modem may change the modulation profile used for the upstream transmitters, and access router 22 may use reduced bitrates and smaller constellations to achieve the same bit error rate while using less transmit power. In certain embodiments, any or all of the foregoing may be referred to as a "low-power state" for modem 26, and may be suitable for certain types of unimportant traffic.

For purposes of illustrating certain example techniques of energy management system 10, it is important to understand how energy management system 10 conserves power. The following foundational information may be viewed as a basis from which the present disclosure may be properly explained. Such information is offered earnestly for purposes of discussion only and, accordingly, should not be construed in any way to limit the broad scope of the present disclosure. DOCSIS is a telecommunications standard that permits the addition of high-speed data transfer to an existing cable TV (CATV) system. DOCSIS is employed by many cable television operators to provide Internet access over existing hybrid fiber-coaxial (HFC) infrastructure. A DOCSIS architecture generally includes two primary components: a cable modem (CM) located at a customer premises (e.g., more generally represented as modem 26a) and a cable modem termination system (CMTS) located at a CATV headend (e.g., more generally represented as access router 22). Cable systems supporting on-demand programming typically use a hybrid fiber-coaxial system. Fiber optic lines bring digital signals to nodes in the system, where they are converted into RF channels and modem signals on coaxial trunk lines.

A DOCSIS cable modem hardware (e.g., modem 26a) can generally be placed into various low-power states, where hardware components may be throttled down or disabled altogether. These hardware components can include a tuner, demodulator, upstream transmitter, main central processing unit (CPU), etc. Some low-power states cause a total loss of network connectivity for some period of time. This makes low-power features difficult or impossible to use for devices like set-top boxes and embedded media terminal adapters (eMTAs) that need continuous uninterrupted access to upstream and/or downstream data. Other low-power states reduce the usable bandwidth available to data consumers. For example, it is desirable for the usable bandwidth to adjust up and down automatically to maximize the potential power savings while minimizing the negative effects to the end user experience. To be effective, these power savings strategies may be employed as frequently as possible without interrupting important data flows.

To identify important data flows, an access router (e.g., access router 22) can be configured with upstream and downstream ACLs. Each ACL may include expressions to match traffic at OSI Layer 2, Layer 3, Layer 4, or any suitable combination thereof. For each modem (e.g., modem 26a-c) in communication with the access router, the access router can monitor the data rate of packets matching ACLs. In addition, each modem may be used to make decisions about entering or leaving power saving states. In an embodiment, each modem can be provisioned with the same or different ACLs that may or may not contain entries from the ACLs in the access router. In another embodiment, each modem may be provisioned with the same ACLs. The ACLs can include packet matching parameters, rate thresholds, time thresholds, timers, etc.

Note that DOCSIS Packet Classifiers are functionally equivalent to ACLs in this context. In an embodiment, when implementing the ACLs, packets such as Address Resolution Protocol (ARP) packets can be identified based on parameters such as the target address. An ARP may be filtered based on parameters within the body of the ARP (e.g., a target hardware address). Other network elements performing network traffic shaping functions may also use the ACLs to identify important traffic.

The access router can be configured to monitor the aggregate data rate used by a cable modem and adjust downstream/upstream channel allocation accordingly. By consolidating traffic on fewer channels, the access router can make a tradeoff between traffic engineering efficiency and modem power consumption. This may be beneficial when the overall network usage is low. Likewise, each modem may request a smaller channel set based on information from a CPE (e.g., CPE 30) or an end user.

In aggressive power savings modes, the access router may only allocate enough channels for important data and data loss can occur for unimportant data. (Important data can be described by the ACLs.) Likewise, the access router may reduce the channels allocated to one or more modems based on its own power-savings needs (e.g., a brownout). In extreme cases, one or more modems may employ only a single downstream channel and not use a transmitter. In one example, the downstream channel can continue to forward multicast traffic. Each modem can restore the upstream channel upon receiving a signal from the access router or based on the need to forward important data.

In another example, if all ACLs show a long enough period of inactivity, each modem may be placed into a standby mode, where no data can be sent or received until the access router sends a wake-up signal. For all the modems connected to the access router, the wake-up signal can optionally indicate which specific modems have data pending at the access router. In an embodiment, the wake-up signal may be delivered using a DOCSIS Media Access Control (MAC) Management Message, so the wake-up process can be effective even if a modem does not have an IP address.

Once a modem has been placed into a standby mode, it can remain there until data for the modem matches the ACLs in either the access router or the modem. In one example, the access router can monitor the downstream ACLs and their associated rate thresholds, while the modem can monitor the ACLs applicable to a user network port. Once the important data exceeds a threshold, the access router may send a wakeup signal to the modem, or the modem may initiate a wakeup with the access router. Upon waking up, the modem can use a wake-on-LAN or similar feature to wake the attached CPE devices (e.g., CPE 30) that will receive important data.

The access router can be configured to take into account the power savings mode of different modems when it makes decisions such as modem load balancing. The access router may also take into account the power savings capabilities of each modem when assigning each modem to specific channels. By taking into account the power savings capabilities of each modem, the current power savings mode that each modem is in, the tier of service for each modem, and/or the current congestion levels on the network, the access router can make intelligent decisions to minimize the energy consumption of each modem and the access router while maximizing the user experience.

The access router can also be configured to have the capability to force all the modems into certain energy savings modes under certain conditions, such as during brownouts. The access router may also adjust the allocated channels to achieve power savings on the access router itself in combination with power savings on the modems. If enough modems have low bandwidth utilization and aggregate bandwidth utilization is low, the access router may choose to assign specific channels to each modem such that the access router can shut down some channels or ports and, thereby, reduce energy consumption of the access router.

In an embodiment, energy management system 10 can be configured to allow an end user to control the power dissipation policies of a modem, behaviors that have side effects on the user's experience of delivered services to the modem, and to allow changes to the modem's operating states to be initiated by the end user. In addition, energy management system 10 can be configured by the network and service provider to control the modem's terminal power dissipation policies and behaviors and to allow changes to the modem's operating states to be initiated by application software. In another embodiment, energy management system 10 can inhibit false alarms from network element management systems that might respond to low-power dissipation states of the modem as if they were fault conditions.

For example, if network elements (e.g., modems 26*a-c*) are in a low-power state, a fault condition could be triggered due to packet loss.

Applications running on a CPE can initiate two-way network communications in response to user interaction and autonomously generated events. Network management systems (e.g., provisioning servers 12, NMS server 14, energy policy server 32, etc.) can initiate two-way network communications to agent processes in the CPE. Two-way communications generally have unicast IP source and destination addresses. Often, network management systems repeatedly transmit certain types of information in structures called data carousels. Data carousels may be addressed to broadcast or multicast destinations. Data carousels usually convey information that is needed by the CPE, but that is unsuitable for storage in the CPE's persistent memory. For instance, if the CPE is a set-top box, system information and program guide information changes occasionally and this information would not be reliable when the set-top box activates after a significant time offline. Carousels deliver data with performance independent of the number of set-top boxes served. In addition, broadcast carousels can remain effective in some situations, where upstream communications are impaired.

Several element management and provisioning protocols may use downstream datagram delivery that terminate at the CPE. Some of these datagrams may be unsolicited by the CPE and do not result in any attempt to respond with an acknowledgement. Examples include conditional access Entitlement Management Messages and MPEG DSM-CC passthrough messages when the CPE is a set-top box.

For a low-power dissipation state in which a modem ceases to act on DOCSIS station maintenance opportunities, rapid resumption of a two-way IP data forwarding service is desired when exiting a low-power dissipation state. DOCSIS 1.0/1.1/2.0/3.0 systems typically take 15 to 60 seconds to complete the re-initialization and registration process. Registration delays suffer contributions from the modem, the access routers, servers, etc. Energy management system 10 can be configured to allow these elements to remain synchronized such that a return to full modem operation takes no more than several hundred milliseconds.

The modem might need to maintain values in memory including IP addresses, configuration file settings, service identifier (SID) values, downstream service identifier (DSID) values, service agreement identifier (SAID), BPI+ state, etc. The modem can be configured to keep track of elapsed time. In one example, the modem may be free from having to maintain autonomous tracking of elapsed time during a low-power dissipation state, even though some set-top boxes support scheduled events.

The modem can be configured to send messages that signal entry into a low-power dissipation state and indicate which modem activities that are normally visible are now being suspended. For example, when the modem registers with the network, a server sends a configuration file to the modem. In response, the modem constructs a REG-REQ, REG-REQ-MP, REG-RSP, REG-RSP-MP, etc. message including indications of the modem's capabilities and then sends the message to the access router. The access router can send a REG-RSP, REG-RSP-MP, etc. message to the modem to indicate the modes to be engaged.

In an embodiment, messages from the network to the modem or CPE can be used to communicate policies such as duty cycle, always-be-on time window, whether the downstream receiver should continue to listen for control messages, etc. Policies of direct interest to the access router may be indicated in extensions in REG-REQ, REG-REQ-MP, REG-RSP and REG-RSP-MP DOCSIS MAC Management messages. The modem and the access router can implement these policies only partially and, thus, may need to be discovered or negotiated. In another embodiment, the ranging operations of the modem may be reduced when coming out of a low-power state. For example, the access router may continue to offer station maintenance opportunities so that the modem can go directly to station maintenance and skip initial maintenance.

In one example, RNG-REQ and RNG-RSP messages can be extended to convey an exchange. More specifically, the modem may send a message indicating, "Entering low-power mode now." In response, the access router may send a message indicating, "Acknowledged, return for station maintenance in no longer than X seconds." In another example, a RNG-RSP message may be extended to convey a future time interval over which the next MAP with a station maintenance opportunity would occur so the modem can wake-up just for the maintenance opportunity.

In addition, the RNG-RSP message may be extended to express a signal from the access router to the modem commanding "wake-up for sustained downstream reception for an interval of no less than X seconds," or to separately express "wake-up for two-way operation." The downstream-only reception can be useful if an application needed to push DSG or multicast content like system information or program guide tables.

In one non-limiting example, the modem can continue to be aware of the passage of time in suspended operation modes, with a resolution no coarser than 10 milliseconds. The modem may also consider the uncertainty in its own timekeeping when scheduling future events so that needed wake-up activities sufficiently precede the events of concern. The modem may cease to maintain its local replica of a SYNC time counter during suspended operation modes. Upon waking from a suspended operation mode, the modem can continue using all attributes and parameters that were obtained from the DHCP process if the DHCP lease (or DHCPv6 lease and router advertisement lifetime) has not expired.

Turning to the example infrastructure associated with present disclosure, CPE 30 can be associated with devices, customers, or end users wishing to receive data or content in energy management system 10 via some network. The term "customer premise equipment" is inclusive of devices used to initiate a communication, such as a receiver, a computer, a set-top box, an Internet radio device (IRD), a cell phone, a smart phone, a tablet, a personal digital assistant (PDA), a Google Android, an iPhone, and iPad, or any other device, component, element, or object capable of initiating voice, audio, video, media, or data exchanges within energy management system 10. CPE 30 may also be inclusive of a suitable interface to the human user, such as a display, a keyboard, a touch pad, a remote control, or other terminal equipment. CPE 30 may also be any device that seeks to initiate a communication on behalf of another entity or element, such as a program, a database, or any other component, device, element, or object capable of initiating an exchange within energy management system 10. Data, as used herein in this document, refers to any type of numeric, voice, video, media, or script data, or any type of source or object code, or any other suitable information in any appropriate format that may be communicated from one point to another.

Service provider backbone 20 and access network 24 each represent a series of points or nodes of interconnected communication paths for receiving and transmitting packets of information that propagate through energy management system 10. Service provider backbone 20 and access network 24 each offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and DOCSIS cable television (CATV). The architecture of the present disclosure may include a configuration capable of transmission control protocol/internet protocol (TCP/IP) communications for the transmission and/or reception of packets in a network.

Access router 22 and modem 26a-c are network elements that can facilitate the power management activities discussed herein. As used herein in this Specification, the term 'network element' is meant to encompass any of the aforementioned elements, as well as switches, cable boxes of any kind (including set-top boxes), CMTSs, CMs, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, access router 22 and/or modem 26a include software to achieve (or to foster) the power management activities discussed herein. This could include the implementation of instances of initialization router energy module 34 and/or modem energy module 36. Additionally, each of these elements can have an internal structure (e.g., a processor, a memory element, etc.) to facilitate some of the operations described herein. In other embodiments, these energy management activities may be executed externally to these elements, or included in some other network element to achieve the intended functionality. Alternatively, access router 22 and/or modem 26a may include software (or reciprocating software) that can coordinate with other network elements in order to achieve the power energy management activities described herein. In still other embodiments, one or several devices may include any suitable algorithms, hardware, software, components, modules, interfaces, or objects that facilitate the operations thereof.

Figure 2:
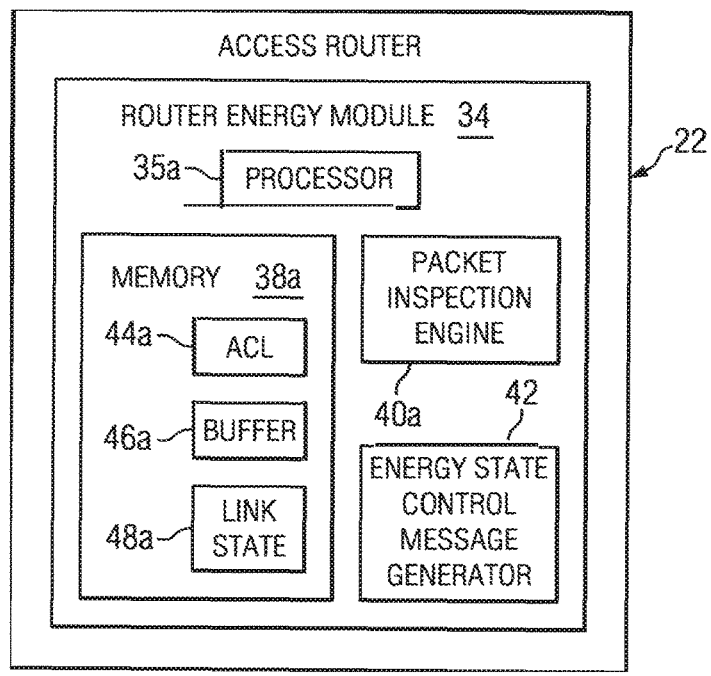
FIG. 2 is a block diagram illustrating possible example details associated with one embodiment of the present disclosure.

FIG. 2 is a simplified block diagram illustrating one possible set of details associated with energy management system 10. FIG. 2 includes access router 22 that includes router energy module 34, which includes a processor 35a, a memory 38a, a packet inspection engine 40a, and an energy state control message generator 42. Memory 38a includes an ACL 44a, a buffer 46a, and a link state 48a. ACL 44a can include one or more ACLs. Buffer 46a can include one or more buffers.

In an example implementation, router energy module 34 may be configured to communicate with modem 26a (or modems 26b and 26c) to shift from one power state to a different power state. More specifically, router energy module 34 can use ACL 44a to identify important data when making decisions about the desired power saving state of modem 26a. In addition, router energy module 34 can buffer important data in buffer 46a while modem 26a is in a reduced power state to minimize data loss.

In an embodiment, ACL 44a in router energy module 34 can be configured with one or more upstream and downstream ACLs, and optionally with a rate threshold for each ACL. Each ACL may include expressions to match traffic at OSI Layer 2, Layer 3, Layer 4, or any suitable combination thereof. In addition, router energy module 34 can be configured to monitor the aggregate data rate connected to ACLs and/or used by modem 26a and adjust downstream/upstream channel allocation accordingly. Further, by consolidating traffic on fewer channels, router energy module 34 can be configured to make a tradeoff between traffic engineering efficiency and modem 26a power consumption, which may be beneficial when the overall network usage is low. Likewise, modem 26a may request a smaller channel set based on information from CPE 30 or an end user. If aggregate data rates are low, access router 22 can ask modem 26a to drop down to a smaller number of channels in order to turn off some channels on access router 22 and, thereby, reduce power consumption of access router 22.

Router energy module 34 can be configured to take into account the power savings mode of different modems 26a-c when it makes decisions such as modem load balancing. Router energy module 34 may also take into account the power savings capabilities of each modem when assigning specific channels to each modem. By taking into account the power savings capabilities of modem 26a, the current power savings mode that modem 26a is in, the tier of service for modem 26a, and/or the current congestion levels on the network, router energy module 34 can make intelligent decisions to minimize the energy consumption of modem 26a and access router 22 while maximizing the user experience.

Buffer 46a may help avoid data loss while modem 26a is in a power savings mode, thus making the power saving system invisible (or somewhat seamless) to the end users. In the downstream traffic flow, when data is important (i.e., matches an entry in ACL 44a) and cannot be delivered to modem 26a, the data can be placed in buffer 46a. Access router 22 can continue to buffer data for modem 26a until it can bring modem 26a back into full service mode (either by sending it a wakeup signal or by increasing the number of channels allocated to it). In one example, modem 26a may not need to go back into full service mode and may (instead) move into any mode that provides sufficient connectivity to allow the buffered data to be delivered to modem 26a.

In one embodiment, an operator or subscriber may want to discard large amounts of unimportant data at certain times to maximize power savings. To facilitate such an action, the subscriber may push a "deep sleep" button on modem 26a that prevents all normal Internet access (e.g., web browsing), but that still allows essential services like VOiP to work normally. Buffering can allow the power savings mode to occur transparently without other network elements being aware of the power saving mode. More specifically, in a set-top network, a headend controller (e.g., Digital Network Control System (DNCS)) periodically sends messages called Entitlement Management Messages (EMMs) in the downstream traffic flow. These messages update entitlements and keys used to decrypt protected content. If multiple EMM refreshes are missed, the set-top will no longer be able to view protected content. With buffering, the EMMs can be delivered even when modem 26a is in a low-power mode (e.g., sleeping). The DNCS does not have to be aware of modem's 26 power savings state. Likewise, buffering allows TCP keepalives to be delivered, allowing TCP sessions to remain alive across an otherwise sleeping modem 26a.

Packet inspection engine 40a can be configured to inspect each packet in upstream and downstream traffic to determine the type of data in each packet. ACL 44a can be used to identify important downstream data such as: EMM messages to CableCARDs, incoming phone calls, TCP keepalives (for idle sessions), SNMP polls from the headends, download triggers, etc. Because the downstream traffic flow is flooded with a barrage of low value data such as ARP messages, Neighbor Discovery messages, port scans, attempted TCP connections for non-critical services, spam email delivery, etc., a wakeup or increase in the allocated channels can be triggered only for critical functions. If modem 26a is indiscriminately woken up every time such a low value message arrives, then modem 26a will have very few opportunities to conserve power. For example, ARPs alone typically arrive at a high rate on the DOCSIS downstream on production headends and a large amount of bandwidth could be consumed by the constant handshaking between access router 22 and modem 26a to move modem 26a into a sleep mode and subsequently wake it back up again. Energy state control message generator 42 can be configured to optimally communicate messages to modem 26a.

Figure 3:
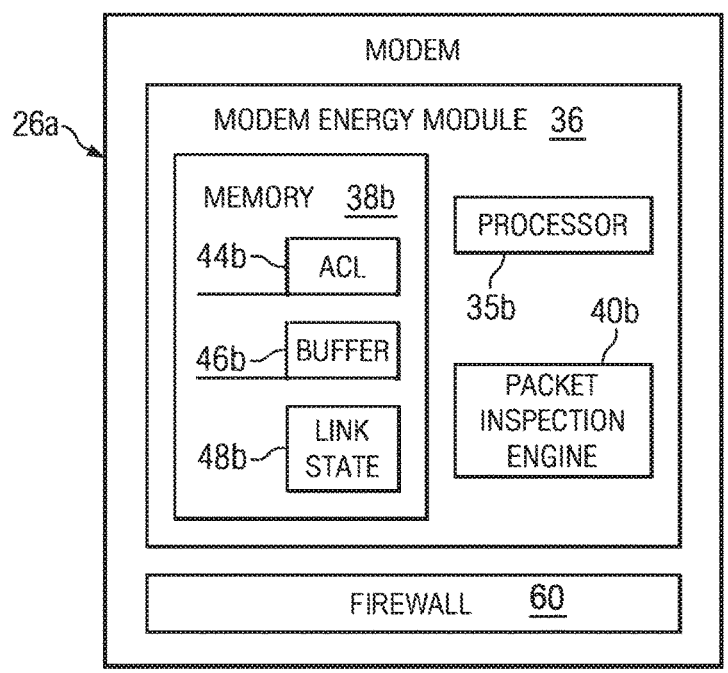
FIG. 3 is a block diagram illustrating possible example details associated with one embodiment of the present disclosure.

FIG. 3 is a simplified block diagram illustrating one possible set of details associated with energy management system 10. FIG. 3 includes modem 26a. Modem 26a may include modem energy module 36, which includes a processor 35b, a memory 38b, and a packet inspection engine 40b. Memory 38b includes an ACL 44b, a buffer 46b, and a link state 48b. ACL 44b can include one or more ACLs. Buffer 46b can include one or more buffers in particular implementations of the present disclosure.

In an example implementation, modem energy module 36 can be configured to communicate with access router 22 to shift from one power state to a different power state. More specifically, modem energy module 36 can use ACL 44b to identify important data when making decisions about the desired power saving state of modem 26a. Modem energy module 34 can buffer important data in buffer 46b while modem 26a is in a reduced power state to minimize data loss.

In an embodiment, ACL 44b in modem energy module 36 can be configured with one or more upstream and downstream ACLs, and optionally with a rate threshold for each ACL. Each ACL may include expressions to match traffic at OSI Layer 2, Layer 3, Layer 4, or any suitable combination thereof. In addition, modem energy module 36 can be configured to monitor the aggregate data rate used by modem 26a and adjust downstream/upstream channel allocation accordingly. By consolidating traffic on fewer channels, modem energy module 36 can be configured to make a tradeoff between traffic engineering efficiency and modem 26a power consumption. This may be beneficial when the overall network usage is low. Likewise, modem 26a may request a smaller channel set based on information from CPE 30 or an end user.

Also note that modem energy module 36 is only one type of numerous types of energy modules for any of a plurality of network devices. An energy device may be used, for example, in connection with a modem, router, switch, firewall, gateway, server, or other similar network device, and such a module may be referred to generally as a "network device energy module."

Buffer 46b may help avoid data loss while in these power savings modes, making the power saving system invisible (or somewhat seamless) to the end users of the system. Buffer 46b can be used to buffer data in the upstream direction matching the ACLs. In the upstream data flow, when data is important (i.e., matches an entry in ACL 44b) and cannot be delivered to access router 22, the data can be placed in buffer 46b. Modem 26a can continue to buffer data for access router 22 until modem 26a is back into full service mode (either by waking up or by increasing the number of channels allocated to it). Buffering can allow the power savings to occur transparently, without other network elements being aware of it at all.

Packet inspection engine 40b can be configured to inspect each packet in upstream and downstream traffic and determine the type of data in each packet. ACL 44b can be used to identify important upstream data such as: messages from the CableCARD to the CA System (e.g., DNCS), outgoing phone calls, download triggers, etc. If modem 26a is indiscriminately woken up every time a low value message needs to be sent, then modem 26a will have very few opportunities to conserve power. Hence, a wakeup or increase the allocated channels may be triggered only for certain critical functions.

Figure 8:
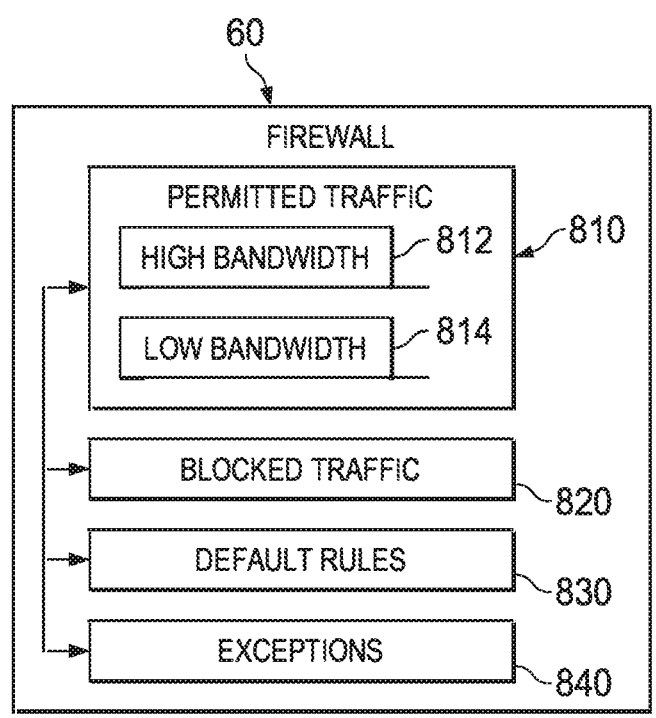
FIG. 8 is a block diagram illustrating possible example details associated with one embodiment of the present disclosure.

Modem 26a may also include a firewall 60, as more fully described in FIG. 8, which may integrate with, complement, or otherwise work in connection with modem energy module 36. Firewall 60 may be controlled by a set of rules, including default rules 830 and exceptions 840. For purposes of this specification, a "firewall rule" encompasses any rule, guideline, parameter, restriction, or criterion used to control internet traffic permissions, blocking, shaping, priority, or monitoring. In some embodiments, default rules 830 and exceptions 850 may be user-configurable through a graphical user interface (GUI), or through a configuration file such as a structured text file. Together, default rules 830 and exception 840 define two classes of traffic: a first class of permitted traffic 810, and a second class of blocked traffic 820. Permitted traffic 810 may further be subclassified into high-bandwidth traffic 812 and low-bandwidth traffic 814. In this embodiment, high-bandwidth traffic is traffic that the user notices and that should therefore use the full capabilities of modem 26 in its high-power state, while low-bandwidth traffic 814 is traffic that the user does not notice and so may not require the full capabilities of modem 26.

These classifications may be subjective to the user, so that the user may deem certain traffic to be important, and thus will want modem 26 to use its high-power or high-bandwidth state to handle that traffic, while the user may deem other classes of traffic to be unimportant, and thus will permit modem 26 to use its low-power or low-bandwidth state to handle that traffic. In general, "important" traffic is any traffic that the user deems to be bandwidth-critical, desired for immediate use or viewing, or where the user otherwise desires for it to be delivered as quickly as possible. "Unimportant" traffic is any traffic that is not "important traffic." A modem or network device's "high-power" state is a state where all or substantially all of its bandwidth-dependent functions or features are enabled and operative, or where the bandwidth capabilities of the modem have not been deliberately degraded for purposes of energy conservation. A modem or network device's "low-power" state is a state where some appreciable portion of its functionality has been degraded for purposes of energy conservation. The term "species" is inherently broad and is meant to include any type of categorization, classification, type, form, mode, grouping, logical sets or divisions. The term subspecies as used herein is intended to include any part of a species, up to and including the entire species, based on a subordinate categorization, type, form, mode, grouping, logical set, or division. Those with skill in the art will recognize, however, that other classification schemes are possible.

A first default rule may be to permit all outgoing connection requests, subject to exceptions. This default rule may be particularly useful in the case of end-user devices that are used primarily for consuming network content, in which case outgoing connection requests may generally result from direct user action, such as requesting a web page or other internet resource, or through network-aware applications running in the background, such as a mail program that periodically checks for new mail, update engines that periodically check for new updates, open web pages operating on Asynchronous Javascript and XML ("Ajax") that frequently check for minor updates, or news feeds. Exceptions may be provided, for example, to block certain ports for security reasons, or specific addresses or blocks of addresses may be blocked, for example, to filter out pornography, malicious websites, illegal websites, and adware. Blocking may be configured based on for example IP address, web address, port number, time of day, and in cases where a firewall 60 is closely integrated with an operating system (as may be the case if firewall 60 is integrated with CPE), the application or process that originated the request. In a case where firewall 60 services more than one device, such as in a home network, additional rules may be provided based on which device originated the request, for example, some devices may be blocked from accessing the internet, or some devices may be given priority over other devices.

Additional granularity of control may be realized by "metering" certain access requests instead of outright blocking them. For example, in another example embodiment, any packet designated for blocking in the preceding examples may instead be designated for metering, in which case the packet may be permitted, but will be allocated only limited network resources, for example, because it is not bandwidth critical. By way of non-limiting example, an operating system update or mail fetch that occurs in the middle of the night may be metered because the user is not waiting for results in real time. This is particularly true if no other active network activity is occurring, which may indicate that the user is not actively using the network. Conversely, watching a video online or loading a web page may be designated as bandwidth-critical, in which case for example port 80 may be permitted maximum available bandwidth for outgoing connection requests.

A second, complementary default rule may be to block all incoming connection requests, subject to exceptions. Again, this rule may be useful for an end-user configuration where it is relatively rare for incoming connection requests to be legitimate traffic, while it is relatively more common for incoming connection requests to be either malicious, like port scans, or undesirable. Nevertheless, the user may want to permit a certain class of incoming packets, which may or may not be metered for bandwidth.

An example user may craft rules that control which types of traffic are permissible, which are dropped, and which are bandwidth-critical. For example, a user may designate that outgoing access requests on port 3074 are blocked unless accessing certain gaming sites, in which case the port should be provided high network priority to avoid lag in the gaming experience. The user may also host open source software on a torrent client, and thus may permit incoming connections on 6881-6999, but may meter the upstream connection to avoid swamping his connection. The user may also permit incoming connections on port 22 so that he can run a secure shell service for remote system management and secure file transfer, and may want to ensure that this port has high bandwidth so that files can be transferred quickly when needed.

Figure 9:
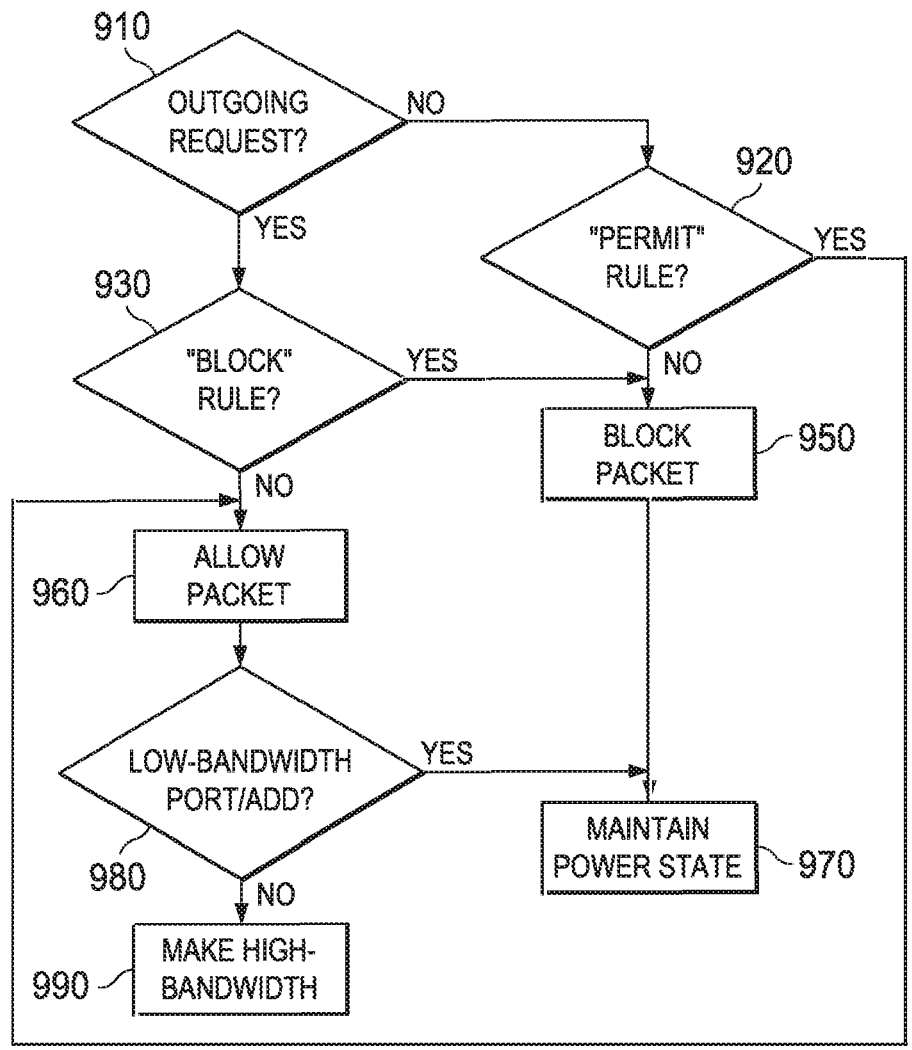
FIG. 9 is a flow diagram illustrating potential operations associated with one embodiment of the present disclosure.

These firewall rules may be used as a basis for providing control signals to modem energy module 36. A non-limiting example process is disclosed in FIG. 9. The embodiment disclosed in FIG. 9 contemplates an example wherein firewall 60 or a similarly-configured device includes both firewall rules and logic for controlling modem energy module 36. For example, firewall 60 may be integrated with modem 26, or modem 26 and firewall 60 may pass signals according to protocols known in the art. In other embodiments, modem energy rules may simply be based on firewall rules included in firewall 60, and those rules may be passed to modem energy module 26a to process according to its normal operation.

According to an example embodiment wherein firewall 60 is configured to provide control signals and logic, in block 910, a connection request is inspected to determine if it is an outgoing or incoming connection request. If it is an incoming connection request, there may be a default rule that blocks all incoming requests except where there is an explicit exception. Thus, in block 920, the request is inspected to see if it falls within one of the "PERMIT" exceptions to the default rule of blocking incoming requests. If the packet does not fall within an exception, then in block 950, the packet is blocked, for example by dropping it. In that case, in block 970, modem energy module 36 should simply maintain its current power state. For example, if modem 26 is currently in a low-power or standby mode, that mode should be maintained. Similarly, if the packet of block 910 is an outgoing packet, there may be a default rule that outgoing packets are allowed unless subject to an explicit exception. So in block 930, the packet is checked to see if it falls within a "BLOCK" exception. If so, then in block 950, the packet is blocked, for example by dropping it, and in block 970, modem 26's current power state is maintained.

On the other hand, if the packet of block 910 is permissible, either via block 920 or block 930, then the packet is allowed in block 960. The packet may then be inspected in block 980 to see if it falls within a port, address or other rule designated for low-bandwidth metering. If the packet is designated for low bandwidth, then in block 970, the current power state of the modem may be maintained. For example, if the modem is in a high-power, high-bandwidth state, no action is required because this power state is suitable for metered access. Similarly, if the modem is in a low-power, low-bandwidth state, no action is required because this mode is likewise suitable for metered access. The only case where action needs to be taken in this situation is if the modem is in a no-access "STANDBY" state, in which case, the course of 706, 710, 712 (FIG. 7) may be followed, as described below.

Conversely, if in block 980 the packet is both allowed and requires high-bandwidth access, then in block 990, the modem will need to be forced to a high-power, high-bandwidth state, for example by following the course of 716, 718, 720 (FIG. 7) as more fully described below. Those with skill in the art will appreciate that many variations on this process are possible. Those with skill in the art will also appreciate that additional intermediate levels of bandwidth may be provided, and that the GUI may permit a user to characterize and classify packets and assign each class of packets any of the available levels of bandwidth. Alternatively, in certain embodiments of the present disclosure, it may be practical to provide only two levels of bandwidth, namely a "high-bandwidth" state where all available RF transmitters and receivers operate, and a "low-bandwidth" state where as few as one transmitter/receiver pair operates. In that case, users may be permitted to subjectively designate "allowed" packets as either bandwidth-critical or not.

Figure 10:
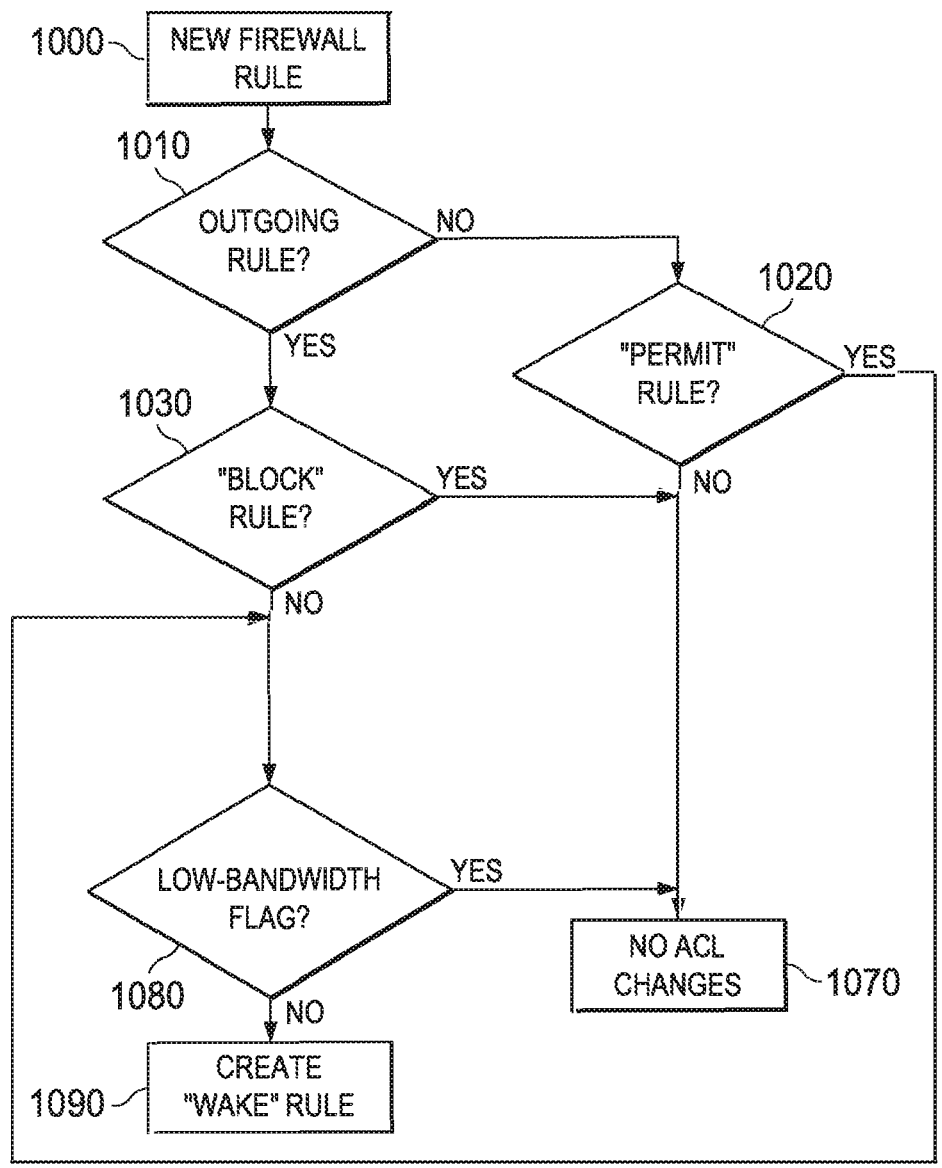
FIG. 10 is a flow diagram illustrating potential operations associated with one embodiment of the present disclosure.

FIG. 10 discloses an alternative method for adding ACL rules according to firewall rules. The method of FIG. 10 may be performed by firewall 60, modem energy module 36, some other device, or some combination of devices. The method of FIG. 10 is useful in one example embodiment for inferring ACLs from firewall rules. Firewall 60 may be configured to provide ACLs based on firewall rules, or firewall 60 may pass firewall rules to energy module 36 so that energy module 36 can create an ACL. In particular, an end user may be provided with a graphical user interface (GUI) or configuration file for creating and modifying firewall rules. Such GUIs and configuration files are known in the art. In addition to certain configuration options, a user may be provided with an option to flag certain classes of traffic as "low bandwidth" or "high bandwidth." For example, a user may want an update server to initiate an incoming connection to push updates to the CPE 30. As above, firewall 60 may be configured to block incoming connections by default and to permit outgoing connections by default. For exceptions to those default rules, the user may flag certain classes of traffic as bandwidth-critical or not. Thus, an exception to the rule that all incoming connections are blocked may be provided for the update server, but the connection may be marked as "low bandwidth" or "not bandwidth critical" because the user may not be concerned with how long the update takes to download. Thus, the update represents a class of traffic that will be permitted by firewall 60, but that does not require modem energy module 36 to "wake" from a low bandwidth state.

In block 1000, a new firewall rule is created, for example by a user interacting with a GUI or entering data in a configuration file. Decision block 1010 queries whether the rule is a rule for outgoing traffic. In this example, outgoing traffic is permitted by default, and incoming connections are blocked by default. Thus, if this is a rule for outgoing traffic, query block 1030 checks whether this is an exception that blocks the traffic. If the traffic is blocked, then no ACL changes are made in block 1070. If the traffic is not blocked, then decision block 1080 checks whether the "low bandwidth" flag has been set for this traffic. If the low-bandwidth flag is set, then again in block 1080, no changes are necessary. However, if the low-bandwidth flag is not set, then in block 1090, an ACL rule to wake modem 26 is created.

If according to decision block 1010 this is a rule for incoming traffic rather than outgoing traffic, then the traffic may be blocked by default, so that if there is not a "permit" exception in block 1020, the traffic is blocked and in block 1070, no ACL changes are made. If there is a "permit" exception, then query block 1080 checks whether the low-bandwidth flag is set for this traffic. If it is set, then in block 1070, no ACL changes are made. If it is not set, then in block 1090, an ACL rule to wake modem 26 is created.

In other embodiments, modem energy module 36 may infer an ACL rule from multiple factors, including firewall rules. Additional factors that may be used to infer an ACL rule may include source IP address, destination IP address, source port, destination port, protocol, ingress interface, egress interface, source MAC address, destination MAC address, EtherType field, 802.IP tag, 802.IQ tag, Differentiated Services Field, Explicit Congestion Notification, originating device, originating application, time of day, and direction of traffic by way of non-limiting example. In one example embodiment, modem energy module 36 is configured to infer ACL rules in real time based on at least one of the foregoing factors.

Figure 11:
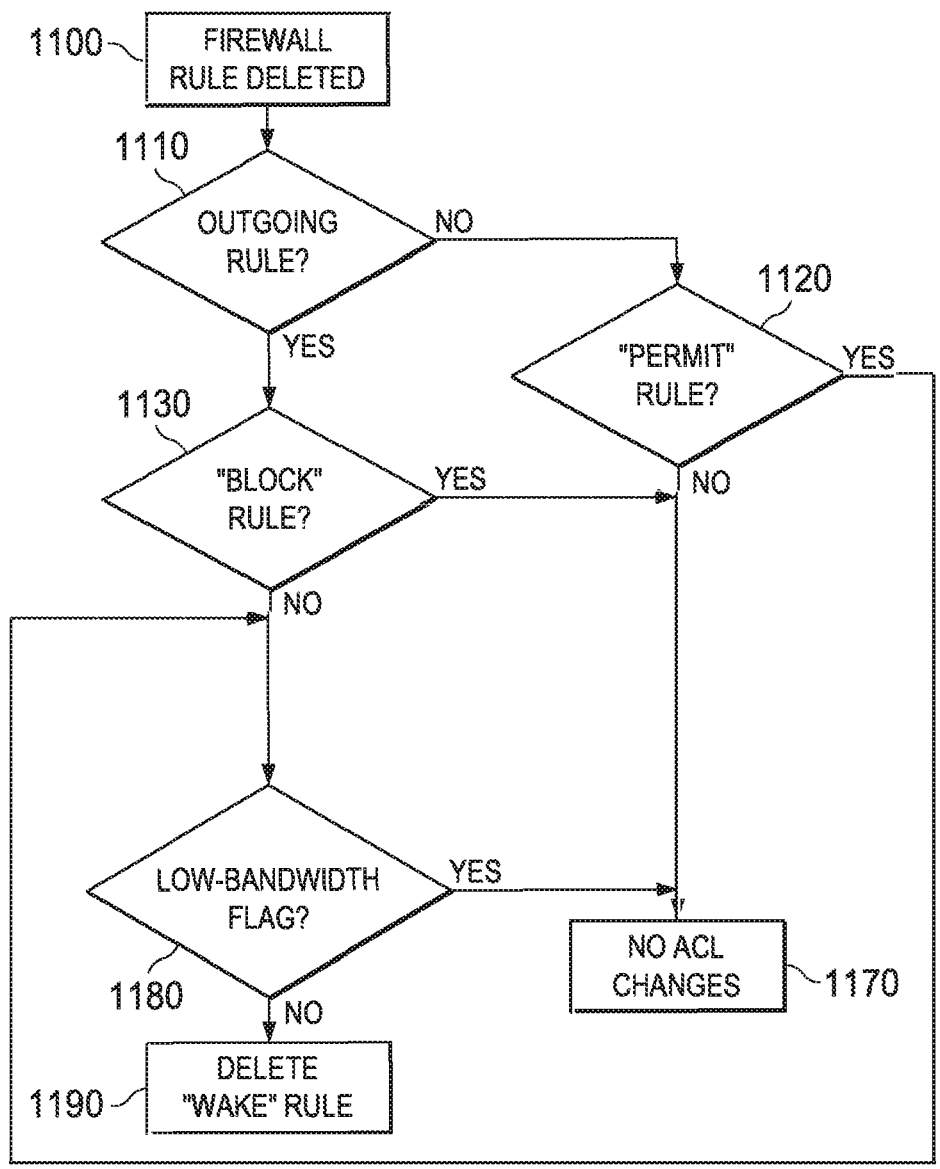
FIG. 11 is a flow diagram illustrating potential operations associated with one embodiment of the present disclosure.

FIG. 11 discloses an example method of deleting ACL rules according to firewall rules. The method of FIG. 11 may be performed by firewall 60, modem energy module 36, some other device, or some combination of devices. The method of FIG. 11 is useful in one example embodiment for inferring removal of an ACL based on firewall rules. Firewall 60 may be configured to provide ACLs based on firewall rules, or firewall 60 may pass firewall rules to energy module 36 so that energy module 36 can update an ACL. In particular, an end user may be provided with a graphical user interface (GUI) or configuration file for creating and modifying firewall rules. Such GUIs and configuration files are known in the art. In addition to certain configuration options, a user may be provided with an option to flag certain classes of traffic as "low bandwidth" or "high bandwidth." For example, a user may want an update server to initiate an incoming connection to push updates to the CPE 30. As above, firewall 60 may be configured to block incoming connections by default and to permit outgoing connections by default. For exceptions to those default rules, the user may flag certain classes of traffic as bandwidth-critical or not. Thus, an exception to the rule that all incoming connections are blocked may be provided for the update server, but the connection may be marked as "low bandwidth" or "not bandwidth critical" because the user may not be concerned with how long the update takes to download. Thus, the update represents a class of traffic that will be permitted by firewall 60, but that does not require modem energy module 36 to "wake" from a low bandwidth state.

In block 1100, an existing firewall rule is deleted, for example by a user interacting with a GUI or entering data in a configuration file. Decision block 1110 queries whether the rule is a rule for outgoing traffic. In this example, outgoing traffic is permitted by default, and incoming connections are blocked by default. Thus, if this is a rule for outgoing traffic, query block 1130 checks whether this is an exception that blocks the traffic. If the traffic is blocked, then no ACL changes are made in block 1170. If the traffic is not blocked, then decision block 1180 checks whether the "low bandwidth" flag has been set for this traffic. If the low-bandwidth flag is set, then again in block 1180, no changes are necessary. However, if the low-bandwidth flag is not set, then in block 1190, it is inferred that an ACL rule to wake modem 26 was created.

If according to decision block 1110 this is a rule for incoming traffic rather than outgoing traffic, then the traffic may be blocked by default, so that if there is not a "permit" exception in block 1120, the traffic is blocked and in block 1170, no ACL changes are necessary. If there is a "permit" exception, then query block 1180 checks whether the low-bandwidth flag is set for this traffic. If it is set, then in block 1170, no ACL changes are made. If it is not set, then in block 1190, it is inferred that an ACL rule to wake modem 26 was created, and that rule is deleted.

In other example embodiments, heuristics may be used to replace or supplement explicit user configuration. For example, firewall 60 may be pre-configured with a set of factors that are suspected to be permissible but not bandwidth-critical, such as accessing common operating system update addresses in the middle of the night. In this case, the user may be notified that this traffic is suspected to be not bandwidth-critical and asked to confirm or deny the assumption. This may be accomplished, for example, by a network broadcast message, a message in a log file, or a popup dialog box. If the user confirms or takes no action, then the assumption may be used to craft a rule going forward for predicting the value of certain types of access requests. In this case, it may be useful to provide the user a means of expressly taking modem 26 out of its low-power state. For example, a Windows device driver may provide a warning icon that appears in the "system tray" when modem 26 is in its low-power state. By interacting with this icon, the user may be able to expressly force modem 26 to its high-power state. Again, traffic patterns that exist when the user forces modem 26 to its high-power state may be used to heuristically predict when it is safe to enter a low-power state without disrupting the user's internet experience.

However modem 26 arrives at its ACL, firewall rules, or other classification system for traffic, it may provide all or part of the ACL to a downstream access router 22. In particular, modem 26 may provide its downstream access rules to access router 22, so that access router 22 knows under which circumstances to enter a higher-power state and increase available bandwidth to modem 26.

Figure 4:
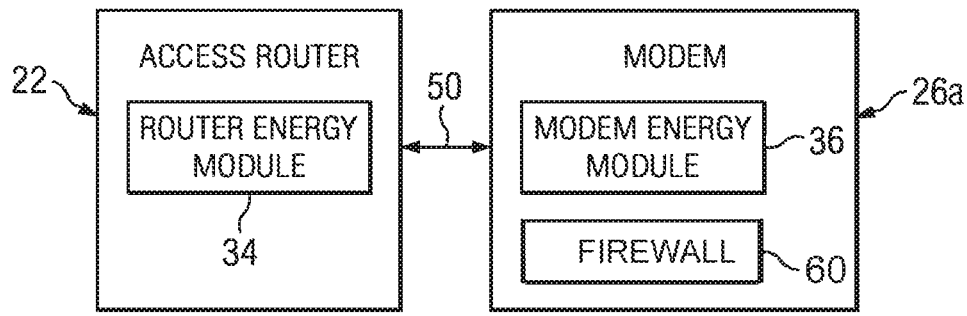
FIG. 4 is a block diagram illustrating possible example details associated with one embodiment of the present disclosure.

FIG. 4 is a simplified block diagram illustrating one possible set of details associated with energy management system 10. FIG. 4 includes access router 22 and modem 26a. Access router 22 includes router energy module 34. Modem 26a includes modem energy module 36. Access router 22 and modem 26a are linked together using communication path 50. Communication path 50 may include several different channels that can be used to communicate with one or more modems. Access router 22 can be configured to monitor the aggregate data rate used by modem 26a and adjust downstream/upstream channel allocation accordingly. In aggressive power savings modes, access router 22 may only allocate enough channels for important data and data loss would occur for unimportant data. Likewise, access router 22 may reduce the channels allocated to cable modems based on its own power-savings needs (e.g., a brownout). Access router 22 may also adjust the allocated channels to achieve power savings on access router 22 itself in combination with power savings on the cable modems. If enough cable modems have low bandwidth utilization, and aggregate bandwidth utilization is also low, access router 22 may choose to assign channels to the cable modems such that access router 22 can shut down some channels or ports and, thereby, reduce energy consumption of access router 22.

Figure 5:
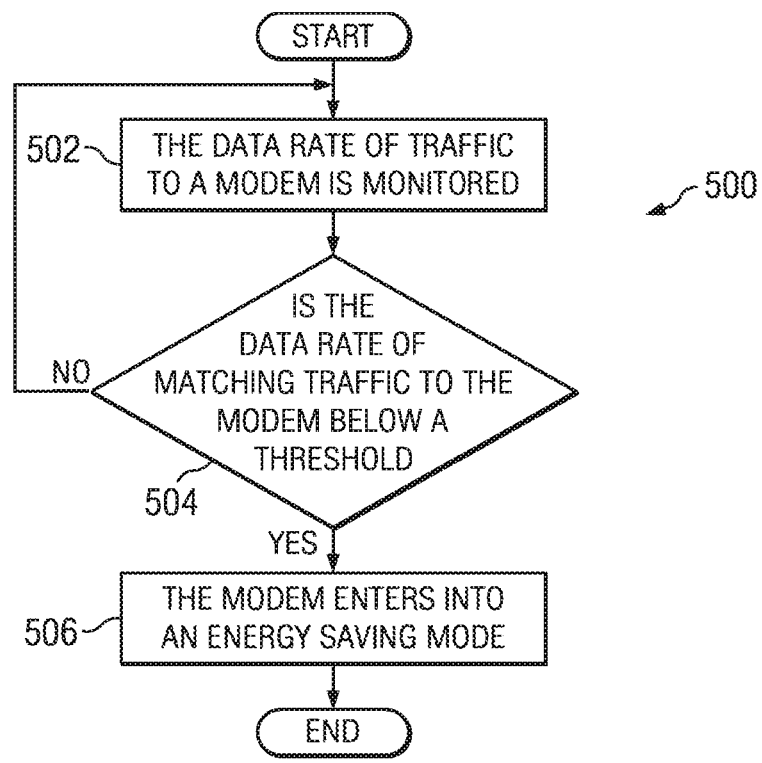
FIG. 5 is a flow diagram illustrating potential operations associated with one embodiment of the present disclosure.

FIG. 5 is a simplified flowchart 500 illustrating example activities for conserving power in an access network. At 502, the data rate of traffic to a modem is monitored. For example, router energy module 34 in access router 22 may monitor the data rate of traffic to modem 26a. In another example, modem energy module 36 in modem 26a may monitor the data rate of traffic to modem 26a. At 504, the system determines if the data rate of matching traffic to the modem is below a threshold. For example, the data rate of traffic that matches an entry in an ACL that is related to the modem may be below a data rate threshold. If the data rate of matching traffic to the modem is not below a data rate threshold, then the system returns to 502 and the data rate of traffic to the modem is monitored. If the data rate of matching traffic to the modem is below a threshold, then the modem enters into an energy saving mode, as in 506. For example, if the data rate of traffic to modem 26a is below a threshold, then energy state control message generator 42 in router energy module 34 may communicate a message (using communication path 50) to modem 26a to enter into an energy saving mode. In another example, if the data rate of traffic to modem 26a is below a threshold, then modem energy module 36 may request modem 26a to enter into an energy saving mode.

Figure 6:
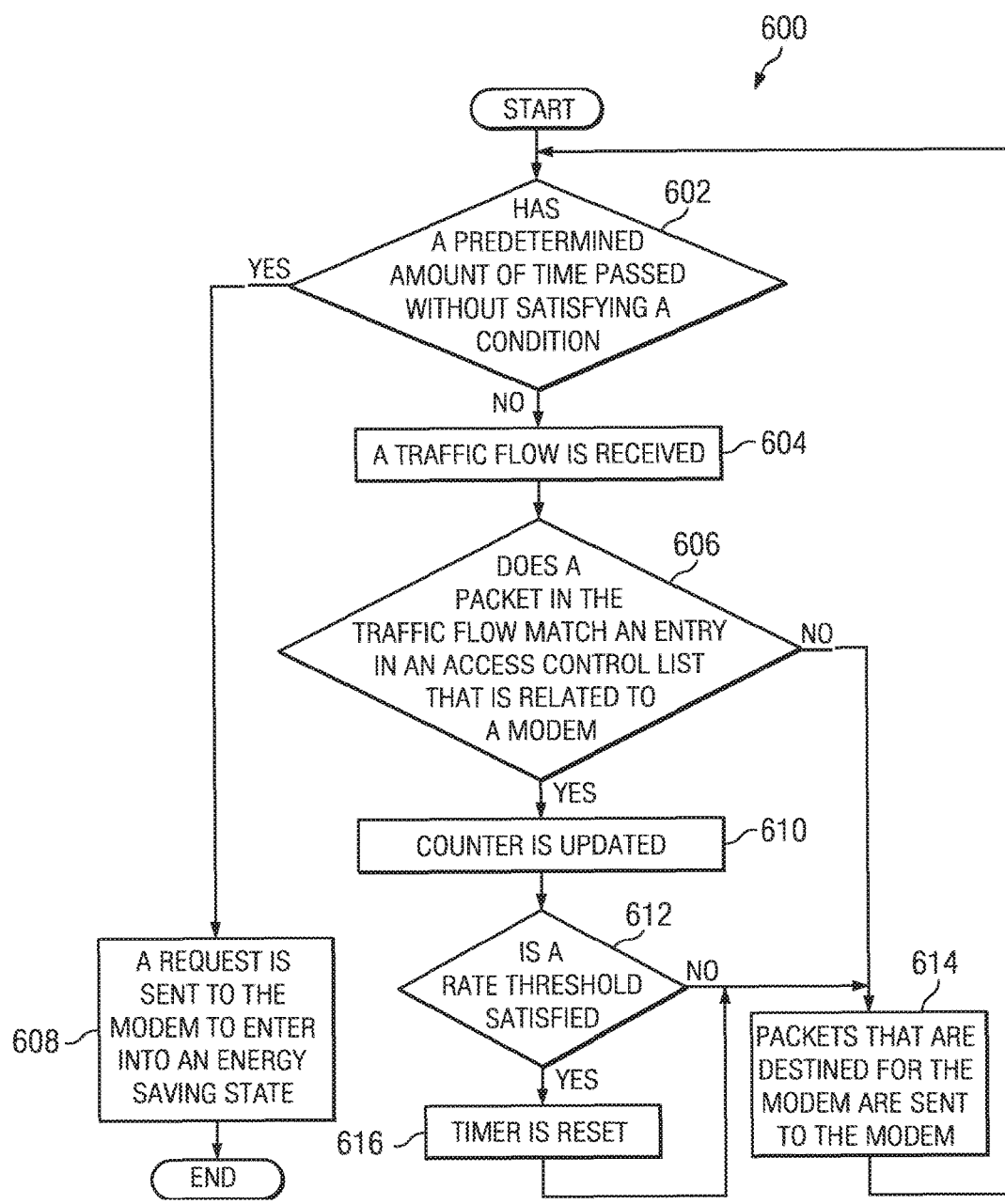
FIG. 6 is a flow diagram illustrating potential operations associated with one embodiment of the present disclosure.

Turning to FIG. 6, FIG. 6 is a simplified flowchart 600 illustrating example activities for conserving power in a network. At 602, the system determines if a predetermined amount of time has passed without satisfying a condition. For example, the system may not receive any important data (e.g., data that matches an entry in an ACL that is related to a modem) within a predetermined amount of time. If a predetermined amount of time has passed without satisfying a condition, then a request is sent to a modem to enter into an energy saving state, as illustrated at 608. If a predetermined amount of time has not passed without satisfying a condition, then a traffic flow is received, as illustrated at 604.

At 606, the system determines if a packet in the traffic flow matches an entry in an ACL that is related to a modem. For example, packet inspection engine 40a may inspect a packet in the traffic flow and router energy module 34 may determine if the packet matches an entry in ACL 44a that is related to modem 26a. If the packet in the traffic flow does not match an entry in an ACL that is related to a modem, then packets that are destined for the modem are sent to the modem, as illustrated at 614, and the system determines if a predetermined amount of time has passed without satisfying a condition, as illustrated at 602. If the packet in the traffic flow does match an entry in an ACL that is related to a modem, then a counter is updated, as illustrated at 610. For example, a counter that determines the predetermined amount of time may be updated.

At 612, the system determines if a rate threshold is satisfied. If the rate threshold is not satisfied, then packets that are destined for the modem are sent to the modem, as illustrated at 614, and the system determines if a predetermined amount of time has passed without satisfying a condition, as illustrated at 602. If the rate threshold is satisfied, then a timer is reset, as illustrated at 616. The timer may be used to determine if a predetermined amount of time has passed, as illustrated at 602. At 614, packets that are destined for the modem are sent to the modem and the system determines if a predetermined amount of time has passed without satisfying a condition, as illustrated at 602.

Figure 7:
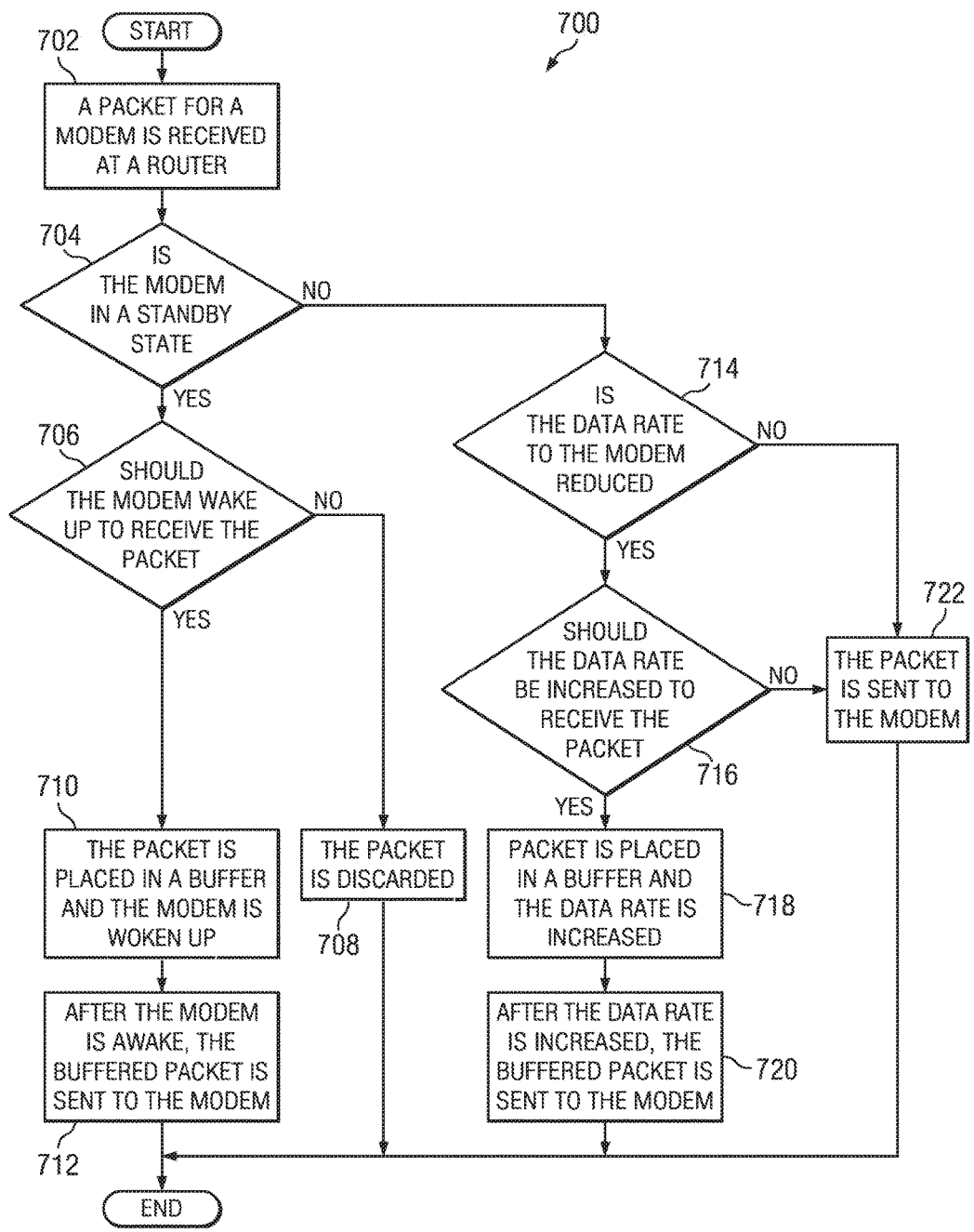
FIG. 7 is a flow diagram illustrating potential operations associated with one embodiment of the present disclosure.

FIG. 7 is a simplified flowchart 700 illustrating example activities for conserving power in a DOCSIS network. At 702, a packet for a modem is received at a router. At 704, the system determines if the modem is in a standby state. If the modem is in a standby state, then the system determines if the modem should wake-up to receive the packet, as illustrated at 706. For example, packet inspection engine 40a may inspect the packet and if the packet matches an entry in ACL 44a then modem 26a should wake-up, if the packet does not match an entry in ACL 44a, then modem 26a should not wake-up. If the modem should not wake-up to receive the packet, then the packet is discarded, as in 708.

If the modem should wake-up, then the packet is placed in a buffer and the modem is woken up, as illustrated at 710.

For example, if modem 26a should wake-up, then the packet may be placed in buffer 46a and energy state control message generator 42 in router energy module 34 may communicate a message (using communication path 50) to modem 26a to wake-up. At 712, after the modem is awake, the buffered packet is sent to the modem. Referring to 704, if the modem is not in a standby state, then the system determines if the data rate to the modem is reduced. (Before the packet was received, the data rate (e.g., number of channels) on communication path 50 to modem 26a may have been reduced.) If the data rate to the modem is not reduced, then the packet is sent to the modem, as in 722. If the data rate to the modem is reduced, then the system determines if the data rate should be increased to receive the packet, as in 716. For example, packet inspection engine 40a may inspect the packet and if the packet matches an entry in ACL 44a, then the data rate should be increased.

If the data rate should not be increased to receive the packet, then the packet is sent to the modem, as in 722. Even though the data rate is reduced, delivery of the packet is attempted on a "best effort" basis and it does not matter if the packet is delivered, dropped, discarded, etc. If the data rate should be increased to receive the packet, then the packet is placed in a buffer and the data rate is increased, as illustrated at 718. At 720, after the date rate is increased, the buffered packet is sent to the modem.

As identified previously, any network element can include software to achieve the energy management operations, as outlined herein in this document. In certain example implementations, the energy management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processors 36a shown in FIG. 2 and processor 35b shown in FIG. 3], or other similar machine, etc.). In some of these instances, a memory element [memory 38a shown in FIG. 2 and memory 38b shown in FIG. 3] can store data used for the operations described herein. This includes the memory element being able to store software, logic, code, or processor instructions that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the energy management activities as outlined herein. Additionally, each of these devices may include a processor that can execute software or an algorithm to perform the energy management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that energy management system 10 (and its teachings) are readily scalable and, further, can accommodate a large number of components, as well as more complicated/sophisticated arrangements and configurations. Accordingly, the examples provided should not limit the scope or inhibit the broad teachings of energy management system 10, as potentially applied to a myriad of other architectures.

It is also important to note that the steps in the preceding FIGURES illustrate only some of the possible scenarios that may be executed by, or within, energy management system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by energy management system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols (e.g., TCP/IP, ARP, UDP, SNMP, etc.), energy management system 10 may be applicable to other exchanges and protocols in which data are exchanged in order to provide energy management operations. In addition, although energy management system 10 has been illustrated with reference to particular elements and operations that facilitate the communication process, these elements and operations may be replaced by any suitable architecture or process that achieves the intended functionality of energy management system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A firewall, comprising:
   logic for providing firewall rules; and
   a user interface for configuring the firewall rules, the interface configured to permit a user to designate a first species of traffic as blocked, a second species of traffic as allowed, and for allowed traffic, to designate a first subspecies and a second subspecies;
   wherein the first subspecies designates traffic as important for a network device energy module, and the second subspecies designates traffic as unimportant for the network device energy module, wherein important traffic comprises traffic that the user identifies as requiring a high-power state for the network device energy module, and unimportant traffic comprises traffic that the user identifies as suitable for a low-power state of the network device energy module.

2. The firewall of claim 1, further comprising:
   logic for inferring an access control list (ACL) for the network device energy module from the firewall rules; and
   a communication interface for communicating the ACL to the network device energy module.

3. The firewall of claim 1, further comprising:
   logic for querying whether a particular rule of the firewall rules is for outgoing traffic;
   logic for evaluating whether an exception is provided for blocking the outgoing traffic;
   logic for evaluating whether a low-power flag has been set for the outgoing traffic; and
   logic for deleting the particular rule.

4. The firewall of claim 1, wherein the user interface is configured to provide for designating traffic as high-power or low-power based on a factor selected from a group of factors, the group of factors consisting of: a source IP address; a destination IP address; a source port; a destination port; a protocol; an ingress interface; and an egress interface.

5. The firewall of claim 1, wherein the user interface is configured to provide for designating traffic as high-power or low-power based on a factor selected from a group of factors, the group of factors consisting of: a source MAC address; a destination MAC address; an EtherType field; a 802.1P tag; and a 802.1Q tag.

6. The firewall of claim 1, wherein the user interface is configured to provide for designating traffic as high-power or low-power based on a factor selected from a group of factors, the group of factors consisting of: a Differentiated Services Field; an Explicit Congestion Notification; an originating device; an originating application; a time of day; and a direction of traffic.

7. The firewall of claim 1, wherein the user interface is further configured to permit the user to designate an additional subspecies comprising an intermediate importance.

8. A system comprising:
   a memory storage; and
   a processing unit coupled to the memory storage, wherein the processing unit is operative to:
   provide firewall rules; and
   provide a user interface for configuring the firewall rules, the user interface configured to permit a user to designate a first species of traffic as blocked, a second species of traffic as allowed, and for allowed traffic, to designate a first subspecies and a second subspecies;

wherein the first subspecies designates traffic as important for a network device energy module, and the second subspecies designates traffic as unimportant for the network device energy module, wherein important traffic comprises traffic that the user identifies as requiring a high-power state for the network device energy module, and unimportant traffic comprises traffic that the user identifies as suitable for a low-power state of the network device energy module.

9. The system of claim 8, wherein the processing unit is further operative to:

infer an access control list (ACL) for the network device energy module from the firewall rules; and communicate, by a communication interface, the ACL to the network device energy module.

10. The system of claim 8, wherein the processing unit is further operative to:

query whether a particular rule of the firewall rules is for outgoing traffic;

evaluate whether an exception is provided for blocking the outgoing traffic;

evaluate whether a low-power flag has been set for the outgoing traffic; and delete the particular rule.

11. The system of claim 8, wherein the user interface is configured to provide for designating traffic as high-power or low-power based on a factor selected from a group of factors, the group of factors consisting of: a source IP address; a destination IP address; a source port; a destination port; a protocol; an ingress interface; an egress interface, a source MAC address; a destination MAC address; an EtherType field; a 802.1P tag; and a 802.1Q tag.

12. The system of claim 8, wherein the user interface is configured to provide for designating traffic as high-power or low-power based on a factor selected from a group of factors, the group of factors consisting of: a Differentiated Services Field; an Explicit Congestion Notification; an originating device; an originating application; a time of day; and a direction of traffic.

13. The system of claim 8, wherein the user interface is further configured to permit the user to designate an additional subspecies comprising an intermediate importance.

14. A non-transitory computer-readable medium that stores a set of instructions which when executed perform a method comprising:

providing firewall rules; and providing a user interface for configuring the firewall rules, the user interface configured to permit a user to designate a first species of traffic as blocked, a second species of traffic as allowed, and for allowed traffic, to designate a first subspecies and a second subspecies;

wherein the first subspecies designates traffic as important for a network device energy module, and the second subspecies designates traffic as unimportant for the network device energy module, wherein important traffic comprises traffic that the user identifies as requiring a high-power state for the network device energy module, and unimportant traffic comprises traffic that the user identifies as suitable for a low-power state of the network device energy module.

15. The non-transitory computer-readable medium of claim 14, further comprising:

inferring an access control list (ACL) for the network device energy module from the firewall rules; and communicating, by a communication interface, the ACL to the network device energy module.

16. The non-transitory computer-readable medium of claim 14, further comprising:

querying whether a particular rule of the firewall rules is for outgoing traffic;

evaluating whether an exception is provided for blocking the outgoing traffic;

evaluating whether a low-power flag has been set for the outgoing traffic; and deleting the particular rule.

17. The non-transitory computer-readable medium of claim 14, wherein the user interface is configured to provide for designating traffic as high-power or low-power based on a factor selected from a group of factors, the group of factors consisting of: a source IP address; a destination IP address; a source port; a destination port; a protocol; an ingress interface; and an egress interface.

18. The non-transitory computer-readable medium of claim 14, wherein the user interface is configured to provide for designating traffic as high-power or low-power based on a factor selected from a group of factors, the group of factors consisting of: a source MAC address; a destination MAC address; an EtherType field; a 802.1P tag; and a 802.1Q tag.

19. The non-transitory computer-readable medium of claim 14, wherein the user interface is configured to provide for designating traffic as high-power or low-power based on a factor selected from a group of factors, the group of factors consisting of: a Differentiated Services Field; an Explicit Congestion Notification; an originating device; an originating application; a time of day; and a direction of traffic.

20. The non-transitory computer-readable medium of claim 14, wherein the user interface is further configured to permit the user to designate an additional subspecies comprising an intermediate importance.

* * * * *